United States Patent
Al-Shedivat et al.

(10) Patent No.: US 12,387,291 B2
(45) Date of Patent: Aug. 12, 2025

(54) VIDEO SUPER-RESOLUTION USING DEEP NEURAL NETWORKS

(71) Applicant: Upwork Inc., San Francisco, CA (US)

(72) Inventors: Maruan Al-Shedivat, Pittsburgh, PA (US); Yihui He, Pittsburgh, PA (US); Megan Hardy, Oakland, CA (US); Andrew Rabinovich, San Francisco, CA (US)

(73) Assignee: Upwork Inc., West Valley City, UT (US)

( * ) Notice: Subject to any disclaimer, the term of this patent is extended or adjusted under 35 U.S.C. 154(b) by 468 days.

(21) Appl. No.: 17/718,136

(22) Filed: Apr. 11, 2022

(65) Prior Publication Data

US 2022/0327663 A1 Oct. 13, 2022

Related U.S. Application Data

(60) Provisional application No. 63/174,307, filed on Apr. 13, 2021.

(51) Int. Cl.
*G06T 3/4053* (2024.01)
*G06T 3/4046* (2024.01)

(52) U.S. Cl.
CPC .......... *G06T 3/4053* (2013.01); *G06T 3/4046* (2013.01)

(58) Field of Classification Search
CPC ............................ G06T 3/4053; G06T 3/4046
See application file for complete search history.

(56) References Cited

U.S. PATENT DOCUMENTS

| | | | |
|---|---|---|---|
| 10,904,476 B1 | 1/2021 | Adams et al. | |
| 11,122,240 B2 | 9/2021 | Peters | |
| 11,158,121 B1* | 10/2021 | Tung | G06N 3/045 |
| 2013/0101002 A1* | 4/2013 | Gettings | H04N 21/41265 |
| | | | 375/E7.138 |
| 2018/0253865 A1 | 9/2018 | Price | |
| 2020/0334789 A1* | 10/2020 | Zhang | H04N 23/69 |

(Continued)

OTHER PUBLICATIONS

López-Tapia, Santiago. "Gated Recurrent Networks for Video Super Resolution.", EUPISCO 2020. 700-704. (Year: 2020).*

(Continued)

*Primary Examiner* — John R Wallace
(74) *Attorney, Agent, or Firm* — Haverstock & Owens, A Law Corporation

(57) ABSTRACT

Methods and systems for obtaining an input video sequence comprising input video frames; determining i) an input resolution of input video frames and ii) a target output resolution of the plurality of input video frames, wherein the target output resolution is higher than the input resolution; and processing the input video sequence using a neural network to generate an output video sequence, comprising, for each of the plurality of input video frames: processing the input video frame to generate an output video frame having the target output resolution, comprising processing the input video frame using a subnetwork of the neural network corresponding to the input resolution of the plurality of input video frames, the neural network configured to process input video frames having one of a set of possible input resolutions and to generate output video frames having one of a set of possible output resolutions.

20 Claims, 5 Drawing Sheets

(56) References Cited

U.S. PATENT DOCUMENTS

| | | | | |
|---|---|---|---|---|
| 2020/0342572 | A1* | 10/2020 | Chen | G06T 3/4046 |
| 2020/0364872 | A1 | 11/2020 | Shelns | |
| 2021/0092462 | A1* | 3/2021 | Cox | H04N 21/23439 |
| 2021/0150278 | A1 | 5/2021 | Dudzik | |
| 2021/0250547 | A1* | 8/2021 | Jiang | H04N 21/25825 |
| 2021/0281867 | A1 | 9/2021 | Golinski | |

OTHER PUBLICATIONS

Wenzhe Shi et al. "Real-Time Single Image and Video Super-Resolution Using an Efficient Sub-Pixel Convolutional Neural Network."2016 IEEE Conference on Computer Vision and Pattern Recognition (CVPR). IEEE, 2016. 1874-1883. (Year: 2016).*
Caballero et al., "Real-time video Super-Resolution with Spatio-Temporal Networks and Motion Compensation," Proceedings of the IEEE Conference on Computer Vision and Pattern Recognition, 2017, pp. 4778-4787 (abstract only).
Donahue et al., "Long-term Recurrent Convolutional Networks for Visual Recognition and Description," Proceedings of the IEEE conference on computer vision and pattern recognition, 2015, 14 pages.
Dong et al., "Image Super-Resolution Using Deep Convolutional Networks," IEEE transactions on pattern analysis and machine intelligence, 2015, 38(2):295-307.
Drulea et al., "Total variation regularization of local-global optical flow," 2011 14th International IEEE Conference on Intelligent Transportation Systems, 2011, 7 pages.
Haris et al., "Deep back-projection networks for super-resolution," Proceedings of the IEEE conference on computer vision and pattern recognition, Mar. 7, 2018, 10 pages.
Huang et al., "Bidirectional recurrent convolutional networks for multi-frame super-resolution," Advances in Neural Information Processing Systems, 2015, pp. 235-243.
International Search Report and Written Opinion in International Appln. No. PCT/US2022/024285, mailed on Jul. 6, 2022, 21 pages.
Jo et al., "Deep Video Super-Resolution Network Using Dynamic Upsampling Filters Without Explicit Motion Compensation," Proceedings of the IEEE Conference on Computer Vision and Pattern Recognition, 2018, 9 pages.
Johnson et al., "DenseCap: Fully convolutional localization networks for dense captioning," Proceedings of the IEEE Conference on Computer Vision and Pattern Recognition, 2016, 10 pages.
Kappeler et al., "Video super-resolution with convolutional neural networks," IEEE Transactions on Computational Imaging, 2016, 2(2):109-122 (abstract only).
Kim et al., "Deeply-recursive convolutional network for image super-resolution," Proceedings of the IEEE conference on computer vision and pattern recognition, 2016, 9 pages.
Lai et al., "Deep laplacian pyramid networks for fast and accurate super-resolution," Proceedings of the IEEE conference on computer vision and pattern recognition, 2017, pp. 624-632 (abstract only).
Ledig et al., "Photo-realistic single image super-resolution using a generative adversarial network," Proceedings of the IEEE conference on computer vision and pattern recognition, 2017, 19 pages.
Lee et al., "Deeply-supervised nets," Artificial intelligence and statistics, Sep. 25, 2014, 10 pages.
Liao et al., "Video super-resolution via deep draft-ensemble learning," Proceedings of the IEEE International Conference on Computer Vision, 2015, 9 pages.

Liu et al., "Robust video super-resolution with learned temporal dynamics," Proceedings of the IEEE International Conference on Computer Vision, 2017, 9 pages.
Liu et al., "Video Super Resolution Based on Deep Learning: A Comprehensive Survey," Dec. 20, 2020, arXiv:2007.12928v2, 30 pages.
Lugmayr et al., "SRFlow: Learning the Super-Resolution Space with Normalizing Flow," Springer, Aug. 28, 2020, 18 pages.
Mao et al., "Deep captioning with multimodal recurrent neural networks (M-RNN)," 2014, arXiv:1412.6632, 17 pages.
Nvictia, "How to Reinvent Virtual Collaboration, Video Communications: NVIDIA Blog," Mar. 17, 2021, retrieved on Jun. 22, 2022, retrieved from URL<https://blogs.nvidia.com/blog/2021/03/17/gtc-maxine-virtual-collaboration-videocommunication/>, 1 page.
Sajjadi et al., "Frame-Recurrent video super-resolution," Proceedings of the IEEE Conference on Computer Vision and Pattern Recognition, Mar. 25, 2018, 9 pages.
Shi et al., "Convolutional LSTM network: A machine learning approach for precipitation nowcasting," Advances in Neural Information Processing Systems 28, Sep. 19, 2015, 12 pages.
Shi et al., "Real-time single image and video super-resolution using an efficient subpixel convolutional neural network," Proceedings of the IEEE conference on computer vision and pattern recognition, Sep. 23, 2016, 10 pages.
Tai et al., "Image super-resolution via deep recursive residual network," Proceedings of the IEEE conference on computer vision and pattern 10 iSeeBetter: Spatio-temporal video super-resolution using recurrent generative back-projection networks 11 recognition, 2017, 9 pages.
Tao et al., "Detail Revealing deep video super-resolution," Proceedings of the IEEE International Conference on Computer Vision, 2017, 9 pages.
Venturebeat.com [online], "Headroom launches to combat Zoom fatigue with AI," Dec. 10, 2021, retrieved on Jun. 22, 2022, retrieved from URL<https://venturebeat.com/2021/12/10/headroom-launches-to-combat-zoom-fatigue-with-ai/>, 1 page.
Venugopalan et al., "Translating videos to natural language using deep recurrent neural networks," Human Language Technologies: The 2015 Annual Conference of the North American Chapter of the ACL, 2015, 11 pages.
Wang et al., "ESRGAN: Enhanced super-resolution generative adversarial networks," Proceedings of the European Conference on Computer Vision (ECCV) Workshops, Sep. 17, 2018, 23 pages.
Wang et al., "Multi-Memory Convolutional Neural Network for Video Super-Resolution," IEEE Transactions on Image Processing, May 1, 2019, 28(5): 2530-2544.
Yang et al., "Image super-resolution: Historical overview and future challenges," Super-resolution imaging, 2010, pp. 20-34 (abstract only).
Yu et al., "Video paragraph captioning using hierarchical recurrent neural networks," Proceedings of the IEEE conference on computer vision and pattern recognition, Apr. 6, 2016, 10 pages.
Yuan et al., "Dual Discriminator Generative Adversarial Network for Single Image Super-Resolution," 2019 12th International Congress on Image and Signal Processing, BioMedical Engineering and Informatics (CISP-BMEI), Oct. 19, 2019, 7 pages.
Zhang et al., "A Flexible Recurrent Residual Pyramid Network for Video Frame Interpolation," arxiv.org, Mar. 31, 2020, 18 pages.
Zhang et al., "The unreasonable effectiveness of deep features as a perceptual metric," Proceedings of the IEEE conference on computer vision and pattern recognition, Apr. 10, 2018, 14 pages.
Yulin Wang; Glance and Focus: a Dynamic Approach to Reducing Spatial Redundancy in Image Classification ( Year: 2020).

* cited by examiner

VIDEO SUPER-RESOLUTION USING DEEP NEURAL NETWORKS

CROSS-REFERENCE TO RELATED APPLICATION

This application claims priority to U.S. Provisional Patent Application No. 63/174,307, filed Apr. 13, 2021, the entire contents of which are incorporated herein by reference.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that processes an image using a neural network to increase the resolution of the image.

In some implementations, the system can increase the resolution of each image in a sequence of images, e.g., each video frame in a video sequence. In some such implementations, the system can process the images in real-time. For example, the system can continuously receive new frames of a video (e.g., a video that is currently being recorded, such as a live video conference) and increase the resolution of the video frames as they are received.

In general, one innovative aspect of the subject matter described in this specification can be embodied in methods that include the actions of: obtaining an input video sequence comprising a plurality of input video frames; determining i) an input resolution of the plurality of input video frames and ii) a target output resolution of the plurality of input video frames, wherein the target output resolution is higher than the input resolution; and processing the input video sequence using a neural network to generate an output video sequence, comprising, for each of the plurality of input video frames: processing the input video frame using the neural network to generate an output video frame having the target output resolution, comprising processing the input video frame using a subnetwork of the neural network corresponding to the input resolution of the plurality of input video frames, wherein the neural network has been configured through training to process input video frames having one of a predetermined set of possible input resolutions and to generate output video frames having one of a predetermined set of possible output resolutions.

Another innovative aspect of the subject matter described in this specification can be embodied in methods that include the actions of: obtaining an input video sequence comprising a plurality of input video frames; determining i) an input resolution of the plurality of input video frames and ii) a target output resolution of the plurality of input video frames, wherein the target output resolution is higher than the input resolution; and processing the input video sequence using a neural network to generate an output video sequence, comprising, for each of the plurality of input video frames: processing the input video frame using the neural network to generate an output video frame having the target output resolution, comprising processing the input video frame using a subnetwork of the neural network corresponding to the input resolution of the plurality of input video frames, wherein the neural network has been configured through training to process input video frames having one of a predetermined set of possible input resolutions and to generate output video frames having one of a predetermined set of possible output resolutions.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The input video sequence can be a live video conference video sequence and the output video frames can be generated in real time. Generating the output video frames in real time can include generating output frames at a rate of at least 10, 20, 30, or 50 Hz. Determining the target output resolution can include receiving data identifying the target output resolution. Obtaining an input video sequence can include obtaining the input sequence by a cloud system and from a first user device; and the method can further include providing the output video sequence to a second user device that is different from the first user device. The neural network can be trained by performing operations comprising: obtaining a training input video frame; processing the training input video frame using a trained machine learning model that is configured detect faces in images; processing, using an output of the trained machine learning model, the training input video frame to generate an updated training input video frame that isolates a detected face in the training input video frame; processing the updated training input video frame using the neural network to generate a predicted output video frame; and updating a plurality of parameters of the neural network according to an error of the predicted output video frame. The neural network can include one or more gated recurrent units (GRUs) that are configured to maintain information across different input video frames in the input video sequence. The neural network can be trained by performing operations comprising: processing a training input video frame using the neural network to generate a predicted output video frame; processing the predicted output video frame using a discriminator neural network to generate a prediction of whether the predicted output video frame was generated by the neural network; updating a plurality of parameters of the neural network in order to increase an error of the discriminator neural network.

The subject matter described in this specification can be implemented in particular embodiments so as to realize one or more of the following advantages.

Using techniques described in this specification, a system can increase the resolution of video frames in a real-time video streaming setting, also called "super-resolving" the video frames. In some implementations, the techniques described in this specification can ensure that neighboring frames are super-resolved consistently with each other, e.g., to avoid undesired "flickering" caused by inconsistencies between the neighboring frames. Furthermore, the system can apply video super resolution to real-time video communication, thus requiring that each frame in video is processed with very low latency, e.g., to achieve 30 Hz streaming.

In some implementations described herein, a system can execute an efficient video conferencing pipeline to create multiple different versions of a super-resolved image at respective different resolutions, such that the different versions are consistent with each other.

In some implementations described herein, because the videos in a video conferencing setting often mainly focus on people, and on faces in particular, a system can execute a fine tuning approach to improve super resolution quality for facial regions of the image.

Some existing techniques attempt to achieve temporal consistency between neighboring frames by utilizing optical flow between a "reference" frame and one or more neighboring "supporting" frame. Therefore, the performance of these existing models can highly depend on the prediction accuracy of optical flow, and inaccurate optical flow predictions can lead to artifacts in the supporting frames, which also can be propagated into the reconstructed high-resolution video frame. Some techniques described in this specification do not require an optical flow model, and thus are more robust to different inputs.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes a system that processes images using a neural network to increase the resolution of the images.

Figure 1:
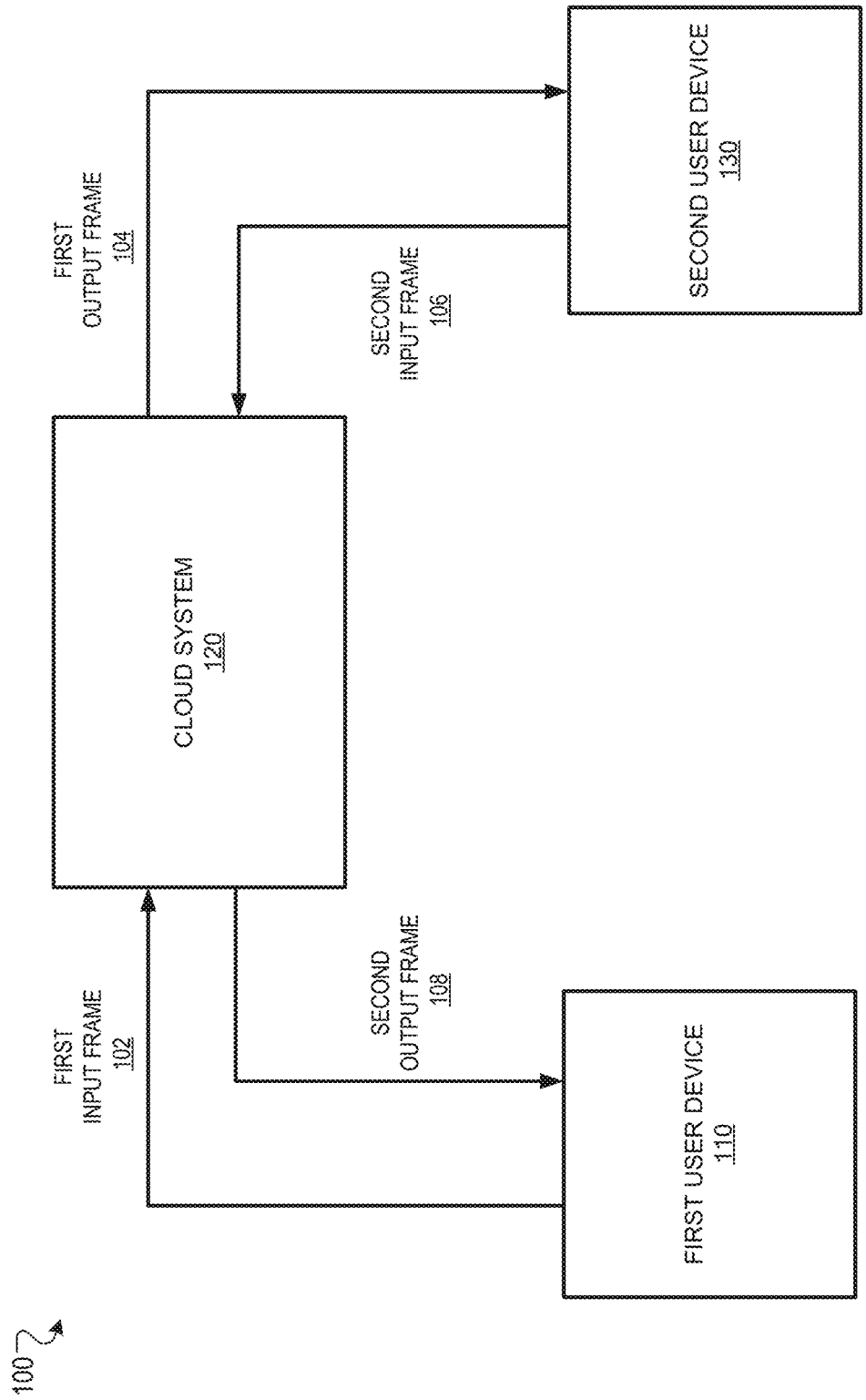
FIG. 1 is a block diagram of an example video streaming system.

FIG. 1 is a block diagram of an example video streaming system 100. The video streaming system 100 is an example of a system implemented as computer programs on one or more computers in one or more locations in which the systems, components, and techniques described below are implemented.

The video streaming system 100 includes two user devices 110 and 130 and a cloud system 120. The cloud system 120 can be a non-local distributed computing system having one or more computing nodes, e.g., hundreds or thousands of computing nodes, in one or more locations. The cloud system 120 can be communicatively coupled to both user devices 110 and 130 by any appropriate form or medium of digital data communication, e.g., a communication network. Examples of communication networks include a local area network (LAN) and a wide area network (WAN), e.g., the Internet.

The video streaming system 100 is configured to communicate video streams between the first user device 110 and the second user device 130. In this specification, a video stream is a video that is captured by a first user device and communicated to a second user device in real time. That is, as the first user device captures video frames of the video, and the first user device communicates the video frames to the second user device. In some implementations, different devices capture and communicate the video stream. That is, a first device (e.g., a camera or webcam) can capture the video frames and a second device (e.g., a laptop or desktop) that is local to the first device can communicate the video frames.

Although two user devices 110 and 130 are depicted in FIG. 1, in general the video streaming system 100 can include any number of user devices that are sending and receiving video streams. Although both user devices 110 and 130 are depicted in FIG. 1 as both sending and receiving respective video streams, in some implementations only a single user device sends a video stream to each other user device in the system 100.

For each video stream communicated between the user devices 110 and 130, the cloud system 120 is configured to receive each video frame of the video stream, process the video frame using a neural network to increase the resolution of the video frame, and send the updated video frame to the other user device.

For example, the first user device 110 can capture a first input frame 102 (called an "input" frame because it will be provided as input to the neural network) and provide the first input frame 102 to the cloud system 120. The cloud system 120 can process the first input frame 102 using the neural network to generate the first output frame 104, which has a higher resolution than the first input frame 102. The cloud system 120 can then provide the first output frame 104 to the second user device 130. The second user device 130 can display the first output frame 104 to a user of the second user device 130.

Similarly, the second user device 130 can capture a second input frame 106 and provide the second input frame 106 to the cloud system 120. The cloud system 120 can process the second input frame 106 using the neural network to generate the second output frame 108, which has a higher resolution than the second input frame 106. The cloud system 120 can then provide the second output frame 108 to the first user device 110. The first user device 110 can display the second output frame 108 to a user of the first user device 110.

In some implementations, the neural network is configured to process input frames that have any one of multiple candidate input resolutions and generate output frames that have any one of multiple candidate output resolutions, satisfying the condition that, for each input frame, the corresponding output frame has a higher resolution. For example, the neural network can be configured to receive i) an input frame that has one of a predetermined finite set of possible input resolutions and ii) an identification of a target output resolution that is one of a predetermined finite set of possible output resolutions, and process the input frame to generate an output frame having the target output resolution.

In some implementations, data received from either the source user device (i.e., the user device from which the cloud system 120 received the video frame) or the destination user device (i.e., the user device to which the cloud system 120 will send the video frame) can identify for the cloud system 120 the target output resolution.

For example, if the source user device is unable to send a video frame that has an appropriately high resolution (e.g., because the source user device has low network bandwidth or is experiencing network connectivity problems), the source user device can reduce the resolution of the video frame to a size that the source user device is able to communicate, and then send the lower-resolution video frame to the cloud system 120 with data identifying the proper target output resolution.

As another example, the destination user device can send data to the cloud system 120 identifying the maximum resolution that the destination user device is able to receive (e.g., based on available network bandwidth of the destination user device); the cloud system 120 can then generate output frames that have the resolution identified by the destination user device.

As another example, the cloud system 120 can monitor its connection with the destination user device, and use the determined strength of the connection to dynamically determine an appropriate output resolution such that the output video frames can be communicated over the connection with the destination user device.

In some implementations, the neural network includes respective subnetworks corresponding to each candidate input resolution and/or respective subnetworks corresponding to each candidate output resolution. An example neural network architecture is described in more detail below with reference to FIG. 2B.

Figure 2A:
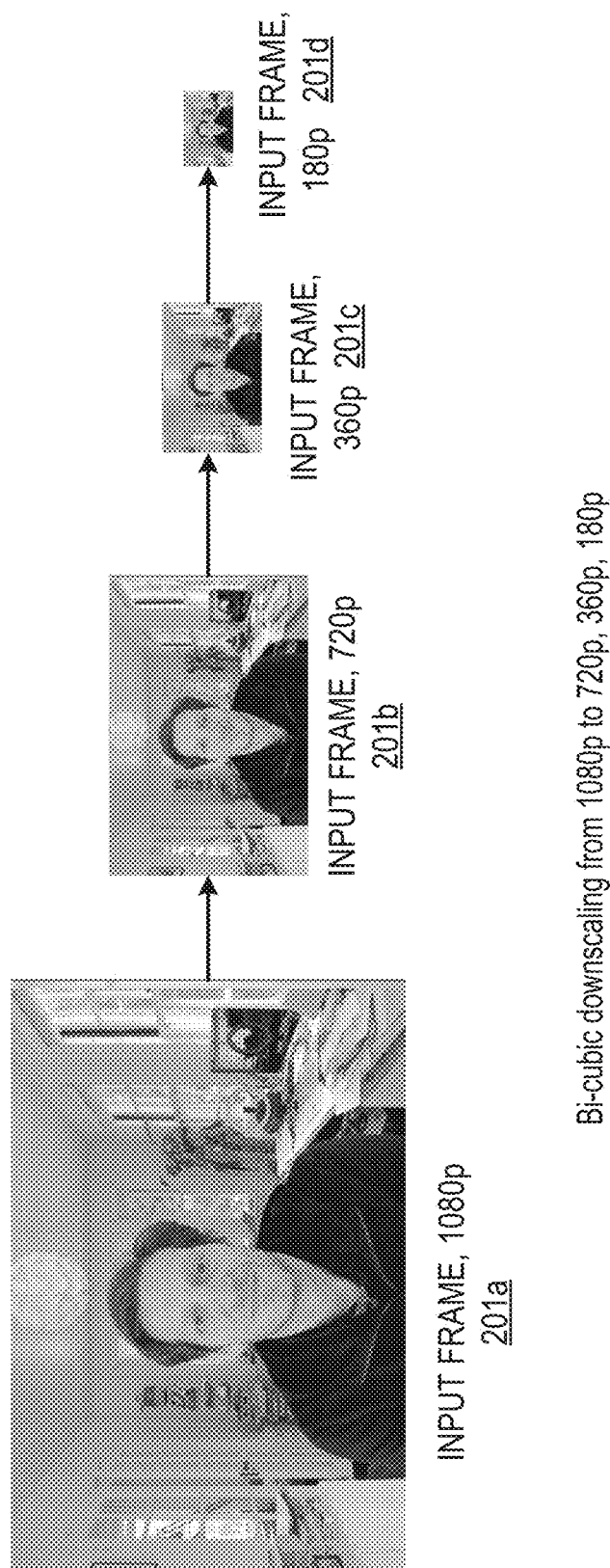
FIG. 2A is an illustration of an example input video frame.

FIG. 2A is an illustration of an example input video frame 201 at different resolutions. The input frame 201a has resolution 1080p, the input frame 201b has resolution 720p, the input frame 201c has resolution 360p, and the input frame 201d has resolution 180p.

During training of a neural network that is configured to increase the resolution of video frames, a training system can obtain a training image having a first resolution (e.g., 1080p) and reduce the resolution of the training image (e.g., using bi-cubic downscaling) one or more times to generate respective downscaled training images (e.g., having 720p, 360p, and 180p). The training system can then process the downscaled training images to generate predicted output images having a target resolution.

When generating an output image having a particular resolution, the training system can determine the training image that has the same particular resolution to be the "ground-truth" image for the output image, and use an error between the ground-truth image and the output image to update the parameters of the neural network. For example, if the neural network processes the training image of resolution 180p to generate an output image of resolution 720p, then the training system can use the input frame 201b (also having resolution 720p) as the ground-truth image for the output image.

Example training techniques are discussed in more detail below with reference to FIG. 4.

Figure 2B:
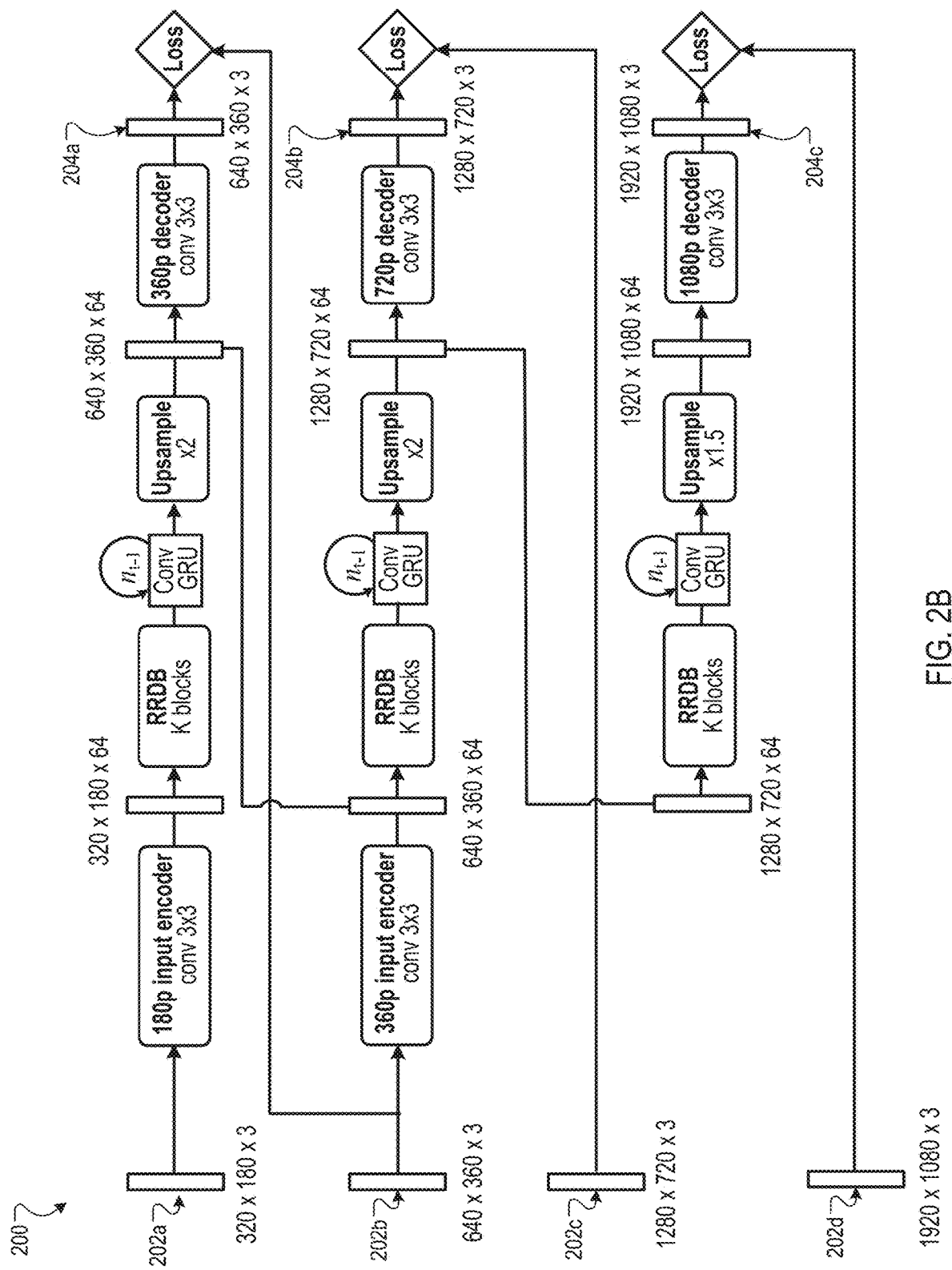
FIG. 2B is a block diagram of an example neural network.

FIG. 2B is a block diagram of an example neural network 200. The neural network 200 is an example of a system implemented as computer programs on one or more computers in one or more locations in which the systems, components, and techniques described below are implemented.

The neural network 200 is configured to process an input image having a first resolution to generate an output image having a second resolution that is higher than the first resolution. For example, the neural network can process each video frame in a video stream, as described above with reference to FIG. 1.

The neural network 200 is configured to receive an input image 202a-c having one of a predetermined set of resolutions. For example, the neural network 200 can receive an input image 202a having resolution 180p, an input image 202b having resolution 360p, or an input image 202c having resolution 720p\. Although the neural network 200 is depicted in FIG. 2B as receiving input images having one of the three resolutions identified above, in general the neural network 200 can process input images having one of any number of predetermined resolutions, and the predetermined resolutions can have any appropriate value. During training of the neural network 200, a training system can also obtain an input image 202d having resolution 1080p for use as a ground-truth image, as described below.

The neural network is configured to generate an output image 204a-c having one of a predetermined set of resolutions. For example, the neural network 200 can generate an output image 204a having resolution 360p, an output image 204b having resolution 720p, or an output image 204c having resolution 1080p. Although the neural network 200 is depicted in FIG. 2B as generating output images having one of the three resolutions identified above, in general the neural network 200 can generate output images having one of any number of predetermined resolutions, and the predetermined resolutions can have any appropriate value.

During training of the neural network 200, a training system can use the input image 202b-d that has the same resolution as the output image 204a-c as the ground-truth image. That is, if the output image is the output image 204c that has resolution 1080p, then the training system can use the input image 202d, which also has resolution 1080p, as the ground-truth image. Note that, in the example depicted in FIG. 2B, the input image 202d (of resolution 1080p) is not actually used as an input to the neural network 200 because 1080p is the maximum target output resolution; that is, the neural network 200 would not process an input image of resolution 1080p to get an output image of resolution 1080p because they have the same resolution.

In some implementations, the neural network 200 can be executed locally on a user device, e.g., on the user device that is receiving the video stream before the user device displays the video stream to a user. In some other implementations, the neural network 200 can be executed on a cloud system, e.g., the cloud system 120 described above with reference to FIG. 1.

The neural network 200 can include one or more Residual-in-Residual Dense Blocks (RRDBs), one or more convolutional gated recurrent unit (GRU) blocks, and/or one or more upsampling layers. These are each described in more detail below.

For input images of one or more resolutions from the predetermined set of input resolutions (in the example depicted in FIG. 2B, for input images of resolution 180p and 360p), the neural network 200 includes an encoding block that generates an embedding of the input image. In this specification, an embedding is an ordered collection of numeric values that represents an input in a particular embedding space. For example, the embedding can be a vector of floating point or other numeric values that has a fixed dimensionality.

For output images of one or more resolutions from the predetermined set of output resolutions (in the example depicted in FIG. 2B, for output images having resolution 360p, 720p, or 1080p), the neural network 200 includes a decoding block that processes the output of the previous neural network layer to generate the output image.

The encoding blocks of the neural network 200 can connect to the body of the neural network 200, which consists of multiple RRDB blocks interleaved with upsampling layers. Each input image passes through part of the body until it is upsampled to an intermediate representation that matches the target output resolution. Then, the intermediate resolution is routed to the corresponding decoding block.

In particular, the neural network 200 can include a respective subnetwork corresponding to each target output resolution, and each input image can be processed by the neural network up until the subnetwork corresponding to the target output resolution. The input image is not processed by the subnetworks corresponding to resolutions that are higher than the target output resolution, which come later in the neural network 200. For example, if the input image is to be super-resolved from 180p to 720p, the input image passes through the body until it is upsampled to a 720p intermediate representation; the last part of the neural network 200 that upsamples intermediate representations to 1080p is not executed.

The neural network 200 can increase the resolution of each video frame in a video sequence such that the updated video frames have temporal consistency with each other. For example, the neural network 200 can include one or more GRUs, e.g., Convolution GRUs, that allow the neural network to learn pixel-to-pixel relationships implicitly between video frames in a video sequence.

Once trained, the neural network 200 supports multiple input resolutions and output resolutions, and can simultaneously super-resolve each frame into multiple output resolutions within a single forward pass. If higher resolutions are unnecessary, the corresponding network branches are not executed, saving computational resources and time. To support fast inference, the neural network 200 can have significantly fewer RRDB blocks on the path from each input to each output resolution than some existing systems, without any loss in quality.

Figure 3:
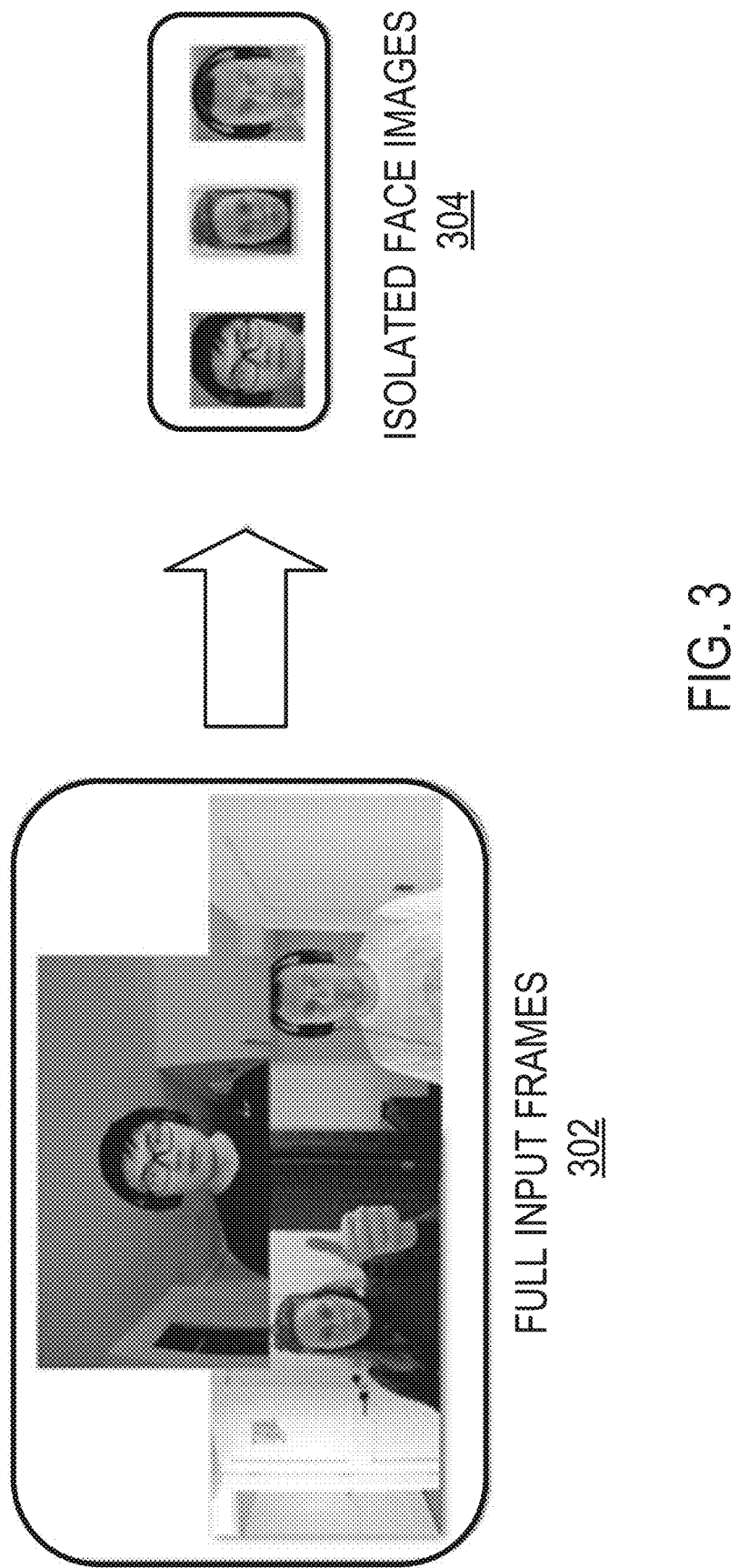
FIG. 3 is an illustration of example input video frames that depict faces.

FIG. 3 is an illustration of example input video frames 302 that depict faces.

In some implementations, during training of a neural network that is configured to increase the resolution of video frames, a training system can isolate the faces in a training image, generating isolated face images 304. For example, the training system can process the full video frames 302 using a trained facial detection machine learning model, and remove the background of the video frames 302 to generate the isolated face images 304.

The training system can then fine-tune the neural network by processing the isolated face images 304 as training inputs to the neural network, generating predicted face images that have a higher resolution. The training system can then update the parameters of the neural network according to an error of the predicted face images. Thus, the neural network can be trained specifically to be able to process images of users' faces to increase the resolution of the images. Because video streams often focus on faces (e.g., during a video call between users), the neural network can thus be trained to ensure that the super-resolved images have accurate depictions of the faces in the images.

Figure 4:
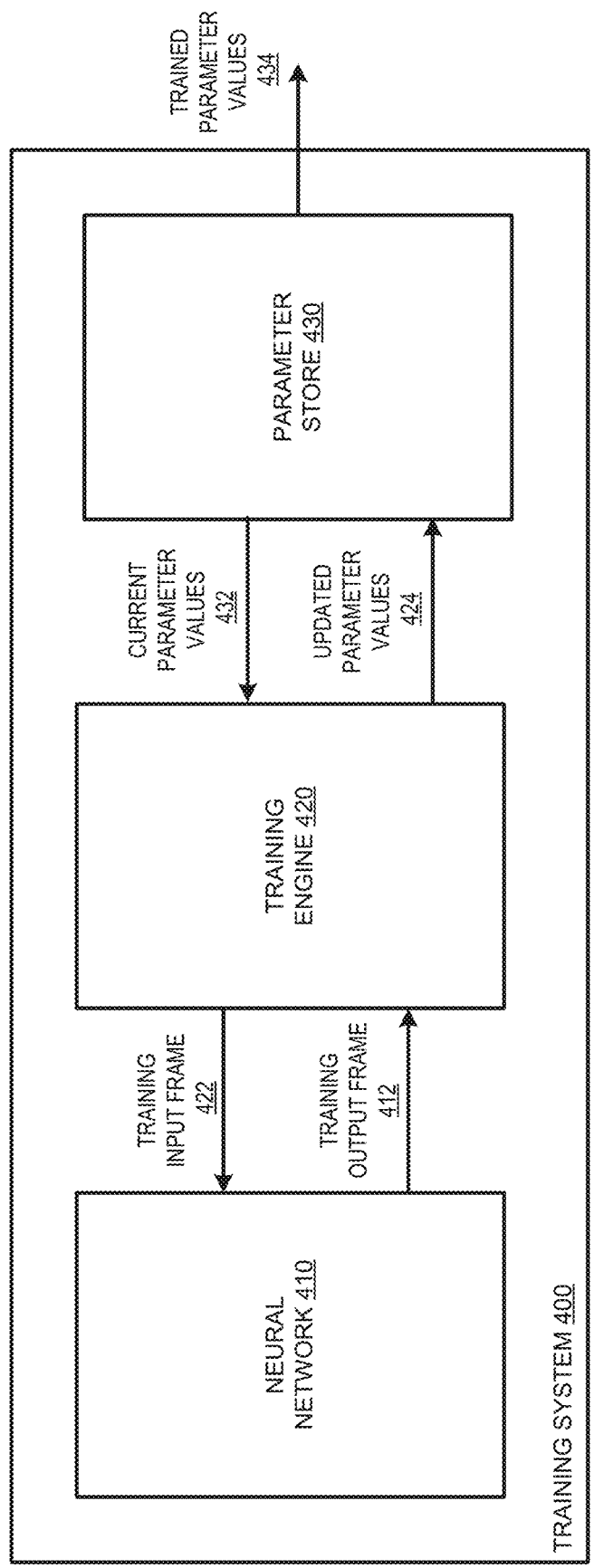
FIG. 4 is a block diagram of an example training system.
Like reference numbers and designations in the various drawings indicate like elements.

FIG. 4 is a diagram of an example training system 400. The training system 400 is an example of a system implemented as computer programs on one or more computers in one or more locations in which the systems, components, and techniques described below are implemented.

The training system 400 is configured to train a neural network 400, e.g., the neural network depicted in FIG. 2B, to increase the resolution of input images. The training system 400 includes the neural network 410, a training engine 420, and a parameter store 430.

The parameter store 430 is configured to store the current values 432 for the parameters of the neural network 410. The training engine 420 can obtain the current parameter values 432 from the parameter store 430, and use the current parameter values 432 to process training input frames 422 using the neural network 410 to generate training output frames 412. The training engine 420 can determine an error in the training output frames 412 to generate a parameter update for the neural network 410.

As described above with reference to FIG. 2A, to train the neural network 410, the training engine 420 can generate a dataset of downsized frames, e.g., 180p, 360p, 720p, and 1080p resolutions (further referred to as multi-resolution samples); lower resolutions can be obtained by cubic downsampling of the original 1080p frame. Optionally, the training engine 420 can further process the multi-resolution samples using additional augmentations, such different levels of JPEG compression.

Given a batch of multi-resolution samples, the training engine 420 can generate 360p, 720p, and 1080p training output frames 412 from 180p and 360p training input frames (i.e., generating a total of 6 outputs). For each output, the training engine 420 can compute a loss; all output-specific losses can then be averaged, and the training engine 420 can use the resulting single loss to perform backpropagation.

Instead of or in addition to direct supervision, the training engine 420 can fine-tune the neural network 410 using a generative adversarial network (GAN) loss. That is, the training engine 420 can process the training output frame 412 using a discriminator neural network (or multiple different discriminator neural networks) that is configured to predict whether the training output frame 412 has been generated by the neural network 410 or is an original, unprocessed image. The training engine 420 can update the parameters of the neural network 410 to increase an error in the predictions of the discriminator neural network, i.e., to make the training output frames 412 appear more realistic. In some implementations, the training engine 420 jointly trains the discriminator neural network with the neural network 410; that is, the training engine 420 can update the parameters of the discriminator neural network to decrease an error in the predictions of the discriminator neural network.

As discussed above with reference to FIG. 3, to further improve the performance of the neural network 410 on faces, the training engine 420 can finetune the neural network 410 using isolated face images. In particular, a system (e.g., the training system 400 or another system) can crop the faces found above a certain confidence threshold on 180p, 360p, 720p, and 1080p input frames to construct pairs as a training dataset. The cropped faces that are too small (e.g., below a threshold number of pixels) can be discarded. During finetuning, the learning rate can be decreased (e.g., to 10% of the original learning rate), such that the neural network 410 does not "forget" what it has already learned.

Once the error is computed, the training engine 420 can use backpropagation and stochastic gradient descent to determine an update to the parameters θ of the neural network.

After updating the parameters of the neural network, the training engine 420 can provide the updated parameter values 424 to the parameter store 430.

After training is completed, the training system 400 can output the final trained values 434 of the parameters of the neural network. In some implementations, the training system 400 can determine to complete training after processing a predetermined number of training examples. In some other implementations, the training system 400 can determine to complete training after a performance metric (e.g., prediction accuracy of a validation or testing data set) of the neural network exceeds a predetermined threshold. In some other implementations, the training system 400 can determine to complete training after an incremental improvement of the performance metric of the neural network across multiple training time steps drops below a predetermined threshold, i.e., after the performance of the neural network is no longer significantly improving.

For example, the training system 400 can provide the trained parameter values 434 to an inference system that is configured to receive input images and to process the input images using the trained neural network to generate a higher resolution versions of the input images. In some implementations, the inference system can be deployed on a local device of a user. In some other implementations, the inference system can be deployed onto a cloud system.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
obtaining an input video sequence comprising a plurality of input video frames;
determining i) an input resolution of the plurality of input video frames and ii) a target output resolution of the plurality of input video frames, wherein the target output resolution is higher than the input resolution; and
processing the input video sequence using a neural network to generate an output video sequence, comprising, for each of the plurality of input video frames:
  processing the input video frame using the neural network to generate an output video frame having the target output resolution, comprising processing the input video frame using a subnetwork of the neural network corresponding to the input resolution of the plurality of input video frames, wherein the neural network has been configured through training to process input video frames having one of a predetermined set of possible input resolutions and to generate output video frames having one of a predetermined set of possible output resolutions.

Embodiment 2 is the method of embodiment 1, wherein the input video sequence is a live video conference video sequence and the output video frames are generated in real time.

Embodiment 3 is the method of embodiment 2, wherein generating the output video frames in real time comprises generating output frames at a rate of at least 10, 20, 30, or 50 Hz.

Embodiment 4 is the method of any one of embodiments 1-3, wherein determining the target output resolution comprises receiving data identifying the target output resolution.

Embodiment 5 is the method of any one of embodiments 1-4, wherein:
obtaining an input video sequence comprises obtaining the input video sequence by a cloud system and from a first user device; and
the method further comprises providing the output video sequence to a second user device that is different from the first user device.

Embodiment 6 is the method of any one of embodiments 1-5, wherein the neural network has been trained by performing operations comprising:
obtaining a training input video frame;
processing the training input video frame using a trained machine learning model that is configured to detect faces in images;
processing, using an output of the trained machine learning model, the training input video frame to generate an updated training input video frame that isolates a detected face in the training input video frame;
processing the updated training input video frame using the neural network to generate a predicted output video frame; and
updating a plurality of parameters of the neural network according to an error of the predicted output video frame.

Embodiment 7 is the method of any one of embodiments 1-6, wherein the neural network comprises one or more gated recurrent units (GRUs) that are configured to maintain information across different input video frames in the input video sequence.

Embodiment 8 is the method of any one of embodiments 1-7, wherein the neural network has been trained by performing operations comprising:
processing a training input video frame using the neural network to generate a predicted output video frame;
processing the predicted output video frame using a discriminator neural network to generate a prediction of whether the predicted output video frame was generated by the neural network; and
updating a plurality of parameters of the neural network in order to increase an error of the discriminator neural network.

Embodiment 9 is a method comprising:
obtaining an input video sequence comprising a plurality of input video frames having an input resolution; and
processing the input video sequence using a neural network to generate an output video sequence, comprising, for each of the plurality of input video frames:
  processing the input video frame using the neural network to generate an output video frame having a target output resolution that is higher than the input resolution, wherein the neural network has been trained by performing operations comprising:
    obtaining a training input video frame;
    processing the training input video frame using a trained machine learning model that is configured detect faces in images;
    processing, using an output of the trained machine learning model, the training input video frame to generate an updated training input video frame that isolates a detected face in the training input video frame;
    processing the updated training input video frame using the neural network to generate a predicted output video frame; and
    updating a plurality of parameters of the neural network according to an error of the predicted output video frame.

Embodiment 10 is the method of embodiment 9, wherein the input video sequence is a live video conference video sequence and the output video frames are generated in real time.

Embodiment 11 is the method of embodiment 10, wherein generating the output video frames in real time comprises generating output frames at a rate of at least 10, 20, 30, or 50 Hz.

Embodiment 12 is the method of any one of embodiments 9-11, wherein:
    obtaining an input video sequence comprises obtaining the input video sequence by a cloud system and from a first user device; and
    the method further comprises providing the output video sequence to a second user device that is different from the first user device.

Embodiment 13 is the method of any one of embodiments 9-12, wherein the neural network comprises one or more gated recurrent units (GRUs) that are configured to maintain information across different input video frames in the input video sequence.

Embodiment 14 is the method of any one of embodiments 9-13, wherein the neural network has further been trained by performing operations comprising:
    processing a training input video frame using the neural network to generate a predicted output video frame;
    processing the predicted output video frame using a discriminator neural network to generate a prediction of whether the predicted output video frame was generated by the neural network; and
    updating a plurality of parameters of the neural network in order to increase an error of the discriminator neural network.

Embodiment 15 is a system comprising: one or more computers and one or more storage devices storing instructions that are operable, when executed by the one or more computers, to cause the one or more computers to perform the method of any one of embodiments 1 to 14.

Embodiment 16 is a computer storage medium encoded with a computer program, the program comprising instructions that are operable, when executed by data processing apparatus, to cause the data processing apparatus to perform the method of any one of embodiments 1 to 14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    obtaining an input video sequence comprising a plurality of input video frames;
    determining i) an input resolution of the plurality of input video frames and ii) a target output resolution of the plurality of input video frames, wherein the target output resolution is higher than the input resolution, wherein the input resolution is dynamically reduced based on a strength of a connection with a destination user device; and
    processing the input video sequence using a neural network to generate an output video sequence, comprising, for each of the plurality of input video frames:
        processing the input video frame using the neural network to generate an output video frame having the target output resolution, comprising processing the input video frame using a subnetwork of the neural network corresponding to the input resolution of the plurality of input video frames, wherein a resolution of the plurality of input video frames is incrementally upsampled to the target output resolution,
    wherein the neural network has been configured through training to process input video frames having one of a predetermined set of possible input resolutions and to generate output video frames having one of a predetermined set of possible output resolutions.

2. The method of claim 1, wherein the input video sequence is a live video conference video sequence and the output video frames are generated in real time.

3. The method of claim 2, wherein generating the output video frames in real time comprises generating output frames at a rate of at least 10, 20, 30, or 50 Hz.

4. The method of claim 1, wherein determining the target output resolution comprises receiving data identifying the target output resolution.

5. The method of claim 1, wherein:
obtaining an input video sequence comprises obtaining the input video sequence by a cloud system and from a first user device; and
the method further comprises providing the output video sequence to a second user device that is different from the first user device.

6. The method of claim 1, wherein the neural network has been trained by performing operations comprising:
obtaining a training input video frame;
processing the training input video frame using a trained machine learning model that is configured to detect faces in images;
processing, using an output of the trained machine learning model, the training input video frame to generate an updated training input video frame that isolates a detected face in the training input video frame;
processing the updated training input video frame using the neural network to generate a predicted output video frame; and
updating a plurality of parameters of the neural network according to an error of the predicted output video frame.

7. The method of claim 1, wherein the neural network comprises one or more gated recurrent units (GRUs) that are configured to maintain information across different input video frames in the input video sequence.

8. The method of claim 1, wherein the neural network has been trained by performing operations comprising:
processing a training input video frame using the neural network to generate a predicted output video frame;
processing the predicted output video frame using a discriminator neural network to generate a prediction of whether the predicted output video frame was generated by the neural network; and
updating a plurality of parameters of the neural network in order to increase an error of the discriminator neural network.

9. A method comprising:
obtaining an input video sequence comprising a plurality of input video frames having an input resolution, wherein the input resolution is dynamically reduced based on a strength of a connection with a destination user device; and
processing the input video sequence using a neural network to generate an output video sequence, comprising, for each of the plurality of input video frames:
processing the input video frame using the neural network to generate an output video frame having a target output resolution that is higher than the input resolution, wherein a resolution of the plurality of input video frames is incrementally upsampled to the target output resolution,
wherein the neural network has been trained by performing operations comprising:
obtaining a training input video frame;
processing the training input video frame using a trained machine learning model that is configured detect faces in images;
processing, using an output of the trained machine learning model, the training input video frame to generate an updated training input video frame that isolates a detected face in the training input video frame;
processing the updated training input video frame using the neural network to generate a predicted output video frame; and
updating a plurality of parameters of the neural network according to an error of the predicted output video frame.

10. The method of claim 9, wherein the input video sequence is a live video conference video sequence and the output video frames are generated in real time.

11. The method of claim 10, wherein generating the output video frames in real time comprises generating output frames at a rate of at least 10, 20, 30, or 50 Hz.

12. The method of claim 9, wherein:
obtaining an input video sequence comprises obtaining the input video sequence by a cloud system and from a first user device; and
the method further comprises providing the output video sequence to a second user device that is different from the first user device.

13. The method of claim 9, wherein the neural network comprises one or more gated recurrent units (GRUs) that are configured to maintain information across different input video frames in the input video sequence.

14. The method of claim 9, wherein the neural network has further been trained by performing operations comprising:
processing a training input video frame using the neural network to generate a predicted output video frame;
processing the predicted output video frame using a discriminator neural network to generate a prediction of whether the predicted output video frame was generated by the neural network; and
updating a plurality of parameters of the neural network in order to increase an error of the discriminator neural network.

15. A system comprising one or more computers and one or more storage devices storing instructions that when executed by the one or more computers cause the one more computers to perform operations comprising:
obtaining an input video sequence comprising a plurality of input video frames;
determining i) an input resolution of the plurality of input video frames and ii) a target output resolution of the plurality of input video frames, wherein the target output resolution is higher than the input resolution, wherein the input resolution is dynamically reduced based on a strength of a connection with a destination user device; and
processing the input video sequence using a neural network to generate an output video sequence, comprising, for each of the plurality of input video frames:
processing the input video frame using the neural network to generate an output video frame having the target output resolution, comprising processing the input video frame using a subnetwork of the neural network corresponding to the input resolution of the plurality of input video frames, wherein a resolution of the plurality of input video frames is incrementally upsampled to the target output resolution,
wherein the neural network has been configured through training to process input video frames having one of a predetermined set of possible input resolutions and to generate output video frames having one of a predetermined set of possible output resolutions.

16. The system of claim 15, wherein the input video sequence is a live video conference video sequence and the output video frames are generated in real time.

17. The system of claim 16, wherein generating the output video frames in real time comprises generating output frames at a rate of at least 10, 20, 30, or 50 Hz.

18. The system of claim 15, wherein determining the target output resolution comprises receiving data identifying the target output resolution.

19. The system of claim 15, wherein:
- obtaining an input video sequence comprises obtaining the input video sequence by a cloud system and from a first user device; and
- the operations further comprise providing the output video sequence to a second user device that is different from the first user device.

20. The system of claim 15, wherein the neural network has been trained by performing operations comprising:
- obtaining a training input video frame;
- processing the training input video frame using a trained machine learning model that is configured to detect faces in images;
- processing, using an output of the trained machine learning model, the training input video frame to generate an updated training input video frame that isolates a detected face in the training input video frame;
- processing the updated training input video frame using the neural network to generate a predicted output video frame; and
- updating a plurality of parameters of the neural network according to an error of the predicted output video frame.

* * * * *